United States Patent [19]
Inoue

[11] 3,781,507
[45] Dec. 25, 1973

[54] SERVOSYSTEM FOR ELECTRICAL MACHINING PROCESSES

[76] Inventor: Kiyoshi Inoue, 3-chome 16-8, Kamiyoga, Setagaya-ku, Tokyo, Japan

[22] Filed: July 17, 1972

[21] Appl. No.: 272,463

Related U.S. Application Data

[62] Division of Ser. No. 19,364, March 13, 1970, Pat. No. 3,686,461.

[30] Foreign Application Priority Data

| Mar. 13, 1969 | Japan | 44/18991 |
| Apr. 2, 1969 | Japan | 44/25317 |
| Apr. 2, 1969 | Japan | 44/25318 |
| Apr. 30, 1969 | Japan | 44/33960 |
| May 30, 1969 | Japan | 44/42188 |
| Nov. 1, 1969 | Japan | 44/87832 |
| Nov. 26, 1969 | Japan | 44/94741 |
| Nov. 26, 1969 | Japan | 44/94742 |

[52] U.S. Cl. .................................. 219/69 G
[51] Int. Cl. ............................. B23p 1/14
[58] Field of Search ............ 219/69 G, 69 R; 13/24

[56] References Cited
UNITED STATES PATENTS

| 1,061,612 | 5/1913 | Heroult | 219/69 G X |
| 2,761,050 | 8/1956 | Ballhausen | 219/69 G |
| 3,531,615 | 9/1970 | Zammit | 219/69 G |
| 3,581,043 | 5/1971 | Ullmann | 219/69 G |

*Primary Examiner*—R. F. Staubly
*Attorney*—Herbert Dubno

[57] ABSTRACT

A servosystem for electrical maching processes adapted to regulate a spark-discharge gap in electrodischarge machining and other material-removal, shaping or forming operations in which the energy of an electrical discharge across the gap is exploited. Instead of the usual reference voltage or other electrical value for comparison with a gap parameter whereby the difference or other algebraic comparison controls the electrode drive, a gap detector is provided to feed a substantially continuous (anlog) value to a discriminator having a threshold value and producing a digital output in accordance with the comparison. The digital output represents an "advance" or a "retract" condition and is communicated via a suitable switch or amplifier to the respective electromagnetic member of the control system, the latter member being a servomotor mechanically coupled with the movable electrode or a fluid-control valve hydraulically or pneumatically coupled with the movable electrode.

9 Claims, 15 Drawing Figures

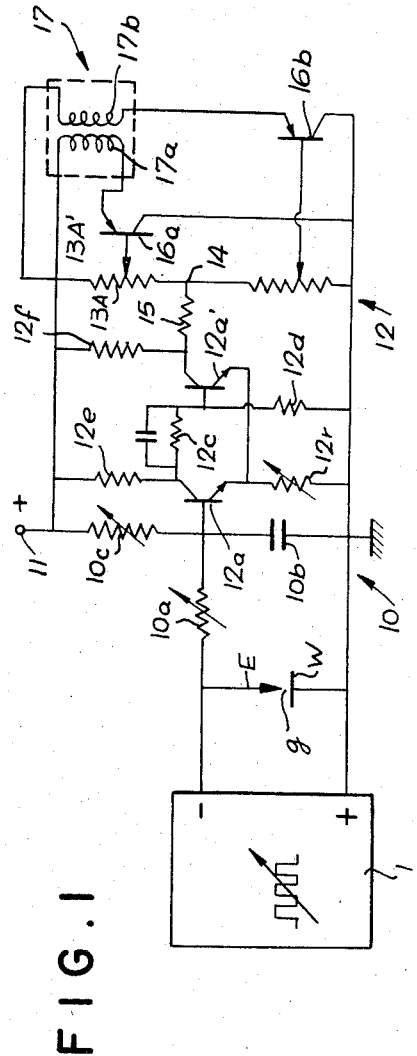
F I G. 1
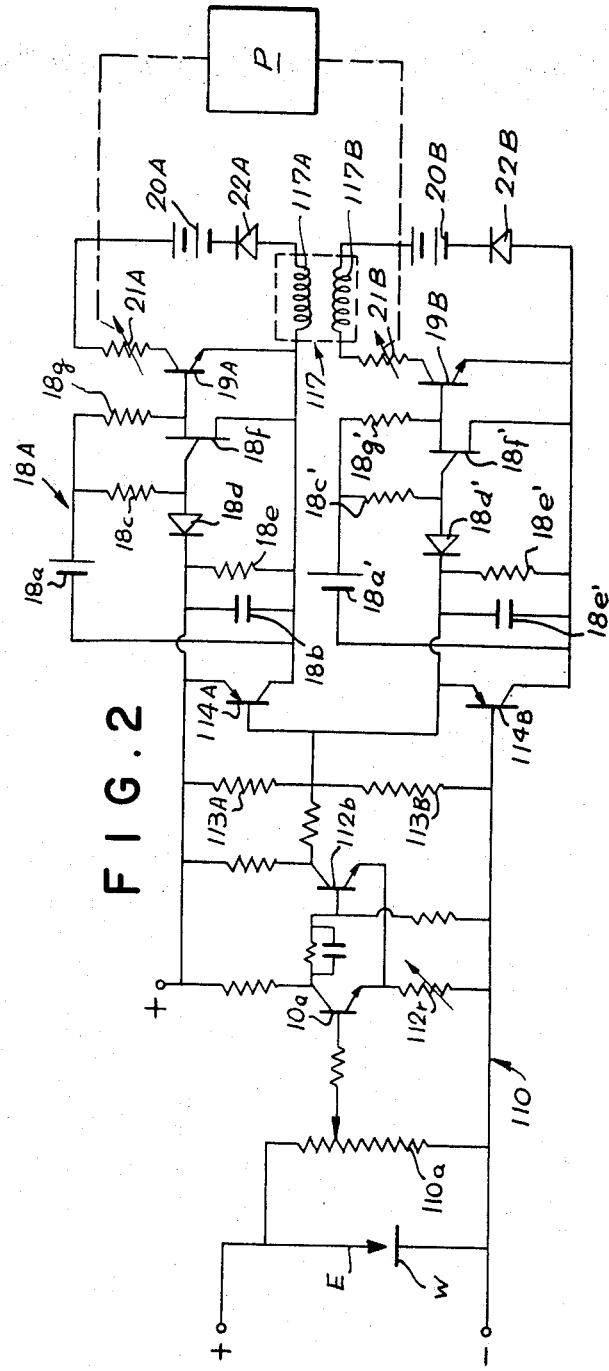
F I G. 2

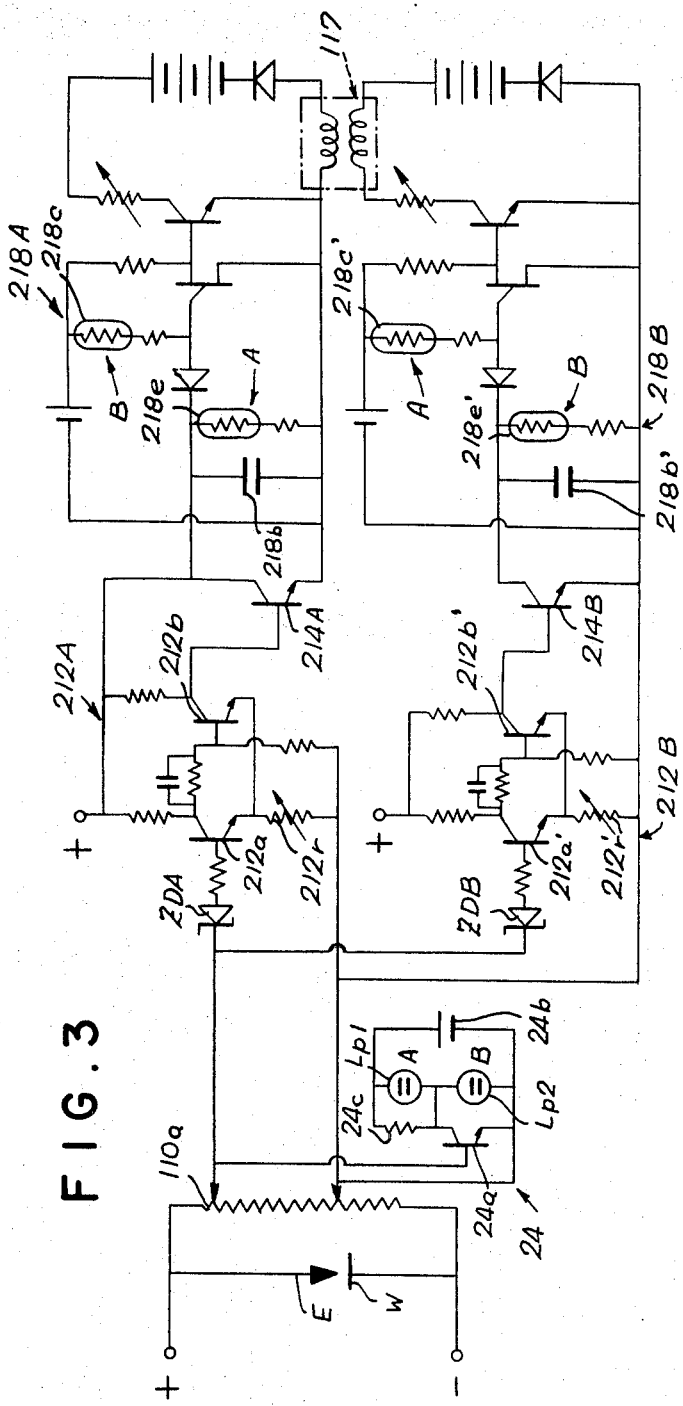
FIG. 3
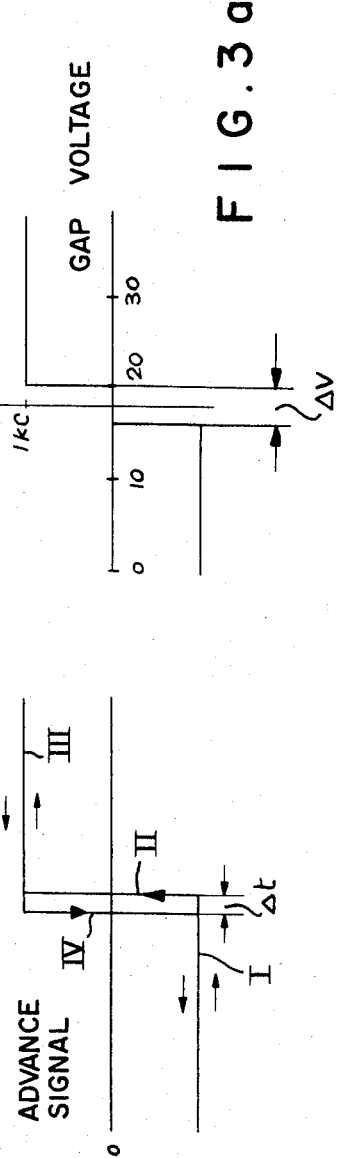
FIG. 3a
FIG. 1a

SERVOSYSTEM FOR ELECTRICAL MACHINING PROCESSES

CROSS-REFERENCES TO RELATED APPLICATIONS

This application is a division of Ser. No. 19,364 filed 13 Mar. 1970, now U. S. Pat. No. 3,686,461 issued 22 Aug. 1972, and is related to subject matter in part disclosed in my application Ser. No. 838,575 filed 2 July 1969, now U.S. Pat. No. 3,604,885 issued 14 Sept. 1971 as a continuation-in-part of then pending application Ser. No. 682,824 filed 14 Nov. 1967 and issued 10 Nov. 1970 as U.S. Pat. No. 3,539,755, and a continuation-in-part of still earlier application Ser. No. 493,473 filed 6 Oct. 1965, now U.S. Pat. No. 3,360,683 issued 26 Dec. 1967.

FIELD OF INVENTION

The present invention relates to a servosystem for electrical machining processes and, more particularly, to a servocontrol arrangement for spark and galvanic gaps, the latter being any dielectric filled space between a pair of electrodes adapted to sustain an electrical discharge thereacross or any electrolyte-filled space between a pair of electrodes as used for the shaping, forming, surfacing, coating or treatment of a workpiece with electrical energy.

The invention has particular reference to electrodischarge machining (EDM) wherein an impulsive spark dischage is generated between a tool electrode and a workpiece across a machining gap which is flooded generally with a dielectric to impulsively remove particles of the workpiece material and allow the removed particles to be carried from the gap by the flowing stream of dielectric; the invention has reference as well to electrochemical machining (ECM) systems which make use of an electrolytic solubilization of workpiece materials into an electrolyte in the gap between the tool electrode and the workpiece, to electrochemical grinding (ECG) systems in which, the tool electrode is generally rotated substantially in contact with the workpiece and an electrolyte serves as the coolant, and various hybrid processes including electrochemical discharge machining (ECDM), electrochemical discharge grinding (ECDG) etc.

The term "electrical-machining process" is intended herein to include so-called spark sintering wherein a spark discharge among a mass of particles provides both the impulsive energy and localized fusion required to sinter the particles together, high-energy-rate forming (HERF) in which a spark discharge produces a shock wave used to shape a workpiece, apply a coating or modify the surface of a workpiece and to any machining or shaping process in which control of a gap between a pair of electrodes is essential.

More particularly, this invention relates to servosystems for elctrical or machining processes in which nonlinear gap characteristics arise, and to improve gap-sensing and control-signal-generating systems for servofeed or electrode positioning to effect optimum performance.

BACKGROUND OF THE INVENTION

As pointed out in application Ser. No. 838,575, electrical discharge machining, hereinafter referred to as EDM, makes use of electroerosive power pulses applied between a workpiece and a tool electrode spacedly juxtaposed across an electrode gap flooded with a dielectric coolant which also serves to carry away the detritus of the electrical discharge machining process.

The tool electrode is generally formed with the desired configuration of the cavity or shape complementarily desired in the workpiece. A train of power pulses is then formed to create localized material-removal discharges having a tendency to produce cumulatively overlapping craters in the workpiece surface; the total surface juxtaposed with the tool electrode is thus machined uniformly over the parts thereof confronting the tool electrode and receive a configuration conforming to the shape of the tool electrode.

During the machining operation, small metallic or conductive chips or particles are carried away by the liquid dielectric which floods the gap and is generally circulated therethrough while the tool electrode is advanced relative to the workpiece by a servomechanism designed to maintain a predetermined gap spacing or to approach the desired gap spacing as accurately as possible.

In the aforementioned application Ser. No. 838,575, it is pointed out that such machining techniques contain many elements which interfere with the predictability of a gap condition and make it difficult to achieve the desired machining state for each pulse. In that application, there is described an "adaptive" power supply in which the character of the pulses is adjusted automatically to suit the gap conditions. In accordance with the principles of that application, electroerosive discharge pulses are optimized to adjust the pulse frequency and other essential pulse parameters, including pulse width, interval, etc. to optimize the machining process.

That system includes closed-loop self-adaptive pulse generators for optimal timing control in an on/off or digital sense of an electronic switching element or power switch operatively connecting d.c. machining-power sources with the machining gap to provide self-adaptive material removal spark-producing pulses. The term "closed-loop" generator is used herein to refer to a system in which the machining gap itself is part of the signal-pulse generator so that the gap itself controls the power circuit and the turning on and turning off the power switch in response to the gap state, thereby permitting the power to be delivered to the gap in a precisely regulated discharge and permitting the termination of the discharge by turning off the switch also in response to the gap state.

The power switch is of the solid-state type and can carry a high d.c. power while ensuring rapid and reliable switching operations under heavy load. The "on" and "off" characteristics of such switches can be generally referred to as "instantaneous" although from time to time the response characteristics may not be perfectly vertical. A sensor in the system provides the machining-gap information manifesting the gap state and this information is derived in the form of a continuous signal or analog signal (the electrical signal obtained being the analog of the gap parameter measured) and fed to an integrating network.

The level of the analog signal changes with time and represents one or more gap parameters at any given time such that the rate of change of the analog signal closely reflects the overall gap state as well as the gap state prior to the discharge in question.

The analog signal is fed to a threshold gating circuit, preferably a Schmitt trigger, wherein the integrated analog signal is compared with a threshold reference to produce either of two possible digit states with sharp interstate transition depending upon the magnitude of the analog signal and thereby function to perform an analog-digital conversion. Thus in one state of the circuit in response to the analog signal, no output appears at the Schmitt trigger (corresponding to the digital "0" signal state). The circuit in another condition of the analog signal produces a square-wave output corresponding to the digital "1" state. This pair of signals functions as a trigger to close the power switch and open the latter, respectively, thereby rendering the switch alternately conductive and nonconductive, preferably via intermediate amplifying stage. By thus controlling the point at which the subsequent discharge is to be initiated, the direction of this discharge and the point at which the discharge is to be terminated or in accordance with the prior condition of the gap and of the gap condition at the moment of the new discharge, a truly self-adaptive regulation of the power pulses is obtainable. In the last-mentioned application it was pointed out that a servocontrol system for regulating the machining gap is practically an essential in EDM operations.

PRIOR ART

While various gap detectors and methods or systems for deriving information from an electrode gap have been proposed heretofore, substantially all prior servotechniques include the provision of an adjustable part for any particular sequence, fixed reference voltage and derivation of an algebraic difference or combination of the reference voltage with a signal voltage drawn from the gap and representing a predetermined gap variable. The result of this algebraic combination of this reference voltage and gap-sensing voltage is an output or control signal which operates a servomotor of the rotary or linear type or of the direct or indirect type to displace the movable electrode until this output signal has been reduced to zero or nullified. The direction of displacement of the servomotor is generally determined by the polarity of the output or difference signal and may be an "advance" or "retraction" signal to narrow or widen the gap.

The reference voltage is preset at a given value to correspond to a desired gap spacing and generally is linear over its range of adjustment so that the difference signal and any amplified servomotor-drive signal assume a linear change in magnitude proportional to the sensed gap variable.

When these principles are used for electrical discharge machining, they are not always successful and cannot provide optimum results for several reasons including the fact that EDM and like machining systems are essentially nonlinear in terms of the characteristics of the gap. For example, the gap is not a simple resistance between the electrodes which varies linearly in accordance with the width of the gap, because of changes in the composition of the coolant, the presence of particles, polarization, breakdown and other phenomena at the gap, intimately associated with machining processing.

Furthermore, the response of the electrode system is seldom ideal so that an electrical command or control signal is not always converted linearly into a corresponding mechanical movement; the lack of correspondence of this type is a consequence of static and dynamic inertia, backlash and other factors present in the mechanical system. Hence, between the sensing of the gap condition and the displacement of the movable electrode to compensate and restore the desired gap condition, there is significant nonlinearity which analog sensing and control appears to multiply rather than decrease.

The term "analog" is here used to refer to the continuous monitoring of the gap condition and the continuous formation of a signal which is as much as possible proportional to the gap condition under consideration. This expression is to be contrasted with "digital" which is intended here to describe discontinuous states, i.e. "on" and "off" states.

In order to illustrate the effect of nonlinearity and the lack of mechanical correspondence between a sensor-produced signal and the displacement of the movable electrode, it is advisable to review the operation of a conventional servosystem when a short circuit occurs. When a short circuit occurs, the servosystem responds to draw the electrodes apart, thereby generating an arc as the electrodes are displaced relatively away from one another (retraction of the movable electrode). The analog feed signal requires a relatively long time to enable the electrode to be retracted fully and to quench the arc.

During the subsequent retraction stage, mechanical inertia causes overtravel. As a result, the analog sensor provides a feed signal instructing the movable electrode to advance. Here again, dynamic inertia exceeds any braking force applied by the servosignal which, as the gap closes, decreases in magnitude prior to reversal and thus is of reduced effectiveness in halting the movement of the electrode. Overtravel in the advanced state may then occur and, dependent upon the stroke and like relationships, may result in short-circuiting.

Whether short-circuiting occurs or not, the mechanical inertia and backlash, in combination with continuous or analog control of the servomotor as described above, result in a hunting of the movable electrode which neither sophisticated high sensitivity, mechanical design nor mechanical brake installation can eliminate. In some instances, installations of the latter type have been found to increase the problems. Between the extreme positions of the electrode, in a center or null zone, an incipient short circuit may occur and cause the oversensitive drive to respond by producing a dead short or condinuous arc. Also, the responsive sensor is clouded by the presence of decomposed machining products and other foreign matter accumulated in the gap such that a differential analog signal itself cannot truly represent the gap conditions.

In summary, therefore, it can be said that a conventional servocontrol system for the positioning of an electrode involved in the formation of an interelectrode gap makes use of a preset reference potential with which a continuously derived analog signal is compared so that the resulting continuous control signal can be applied to a servomotor. This system is generally linear whereas the actual condition of the gap under the varying circumstances occurring during machining is decidedly nonlinear so that the response of the servosystem often is insufficient or antagonistic to restoration of the desired gap state. Moreover, systems of this type are incapable of self-adaptation to provide control which follows the particular machining need in a more or less automatic manner.

OBJECTS OF THE INVENTION

It is the principal object of the present invention to provide an improved servocontrol system for electrical machining or shaping arrangements adapted to regulate an interelectrode gap and capable of overcoming difficulties arising with prior-art arrangements for the same purpose.

Another object of the invention is to provide a servocontrol system for electrical discharge machining and other electrode system which is characterized by a high response rate, reliability and simplicity and eliminates the need for expensive and sophisticated mechanical devices for limiting backlash and overtravel.

It is further object of this invention to provide a method of controlling a movable electrode, in an electrical machining or shaping system, which provides accurate regulation of the position of the movable electrode to maintain a preselected gap width or preselected gap condition designed to optimize machining or shaping performance.

It is also an object of the invention to provide an improved servocontrol apparatus adapted to obviate the disadvantages of earlier systems and provide precision control of the position of an electrode, especially in electrical machining and shaping arrangements.

It is an object of my invention, further, to provide a control circuit with self-adaptive means for regulating the position of an electrode in response to a gap condition.

SUMMARY OF THE INVENTION

The above and other objects are attained, in accordance with the present invention, in a system in which an analog signal is derived from across an interelectrode gap with a time-varying amplitude which preferably is a function of the interelectrode spacing but may be a function of any other gap variable, this analog signal being compared with a threshold to produce a digital output depending upon its relationship to the threshold, i.e. a first digital state when the analog signal exceeds a threshold and a second digital state when the analog signal is below the threshold value.

These digital states are thereafter employed to control the servomechanism and actuate the latter in a sense or direction determined by the prevalent digital state and to an extent determined by the duration of that state.

As opposed to prior-art systems, therefore, the servomechanism responsive to the digital state and reversible, i.e. operative to advance or retract the movable electrode in dependence upon the digital state prevalent at the moment, is capable of correcting the position of the movable electrode only upon the formation of an analog signal which exceeds or lies below the corresponding threshold value to create the digital state, the magnitude of which may be substantially independent of the analog output so that the system is free from the inconveniences of linear control arrangements for regulating nonlinear operations. At no time is a reference voltage so combined with the analog voltage, that the algebraic difference is provided as the control signal.

According to one aspect of the invention, the method comprises the steps of deriving an analog signal varying as a function of a gap variable, preferably the gap spacing; discriminating or comparing the analog signal with respect to at least one threshold value; generating a digital signal of one polarity and a predetermined (given) amplitude when the analog signal is above this threshold value but generating a second digital signal of substantially the same or another absolute amplitude but reverse polarity when the analog signal is below this threshold value; and applying the digital signals to an electrode feed control means, preferably a servomotor, to drive the electrode in a direction determined by the polarity of the digital signal for a duration determined by the duration of the digital signal. The threshold may be constituted by one or more values preset on an empirical basis as corresponding to a desired gap spacing when the machining is carried out in an optimum mode, or may be automatically adjusted (e.g. self-adaptive) as will be apparent hereinafter.

The term "digital signal" as used herein, is intended to refer to a relatively well defined, steep-flank wave form although slight deviation therefrom may be tolerated as will be apparent hereinafter. It is important that during the state at which the particular digital condition exists, the signal reaches an effective potential at the instant of its "on" state but drops below this potential at the moment of its "off" state and has a potential which may be more or less constant, but is effective to operate the servomotor during the "on" and "off" states. The digital states may be represented by "on" or "conductive" conditions of electronic switch devices or by current pulses as required.

Of course, the terms "on" and "off" are not to be understood as limiting the invention unless otherwise indicated, to systems in which the "off" state involves no current flow or development of an electrical potential whatever, but may include low-voltage or low-current states which, in themselves, are incapable of driving the servomotor or have negligible effect thereon. Furthermore, the expression "analog" as used to describe the more or less continuous output of the sensing means, must be treated in its most general sense to include situations in which the signal is not directly proportional to the particular gap condition which is being monitored. In some cases, some other predetermined relationship between the monitored gap condition and the analog signal value representative thereof may be provided.

According to the apparatus aspects of the invention, the sensing means or sensor is connected across the electrodes and draws from the machining gap an analog signal which may take the form of a voltage which varies with time in proportion to or as a function of a gap variable; the gap variable may be the interelectrode spacing and may be represented by a gap voltage (i.e. the voltage developed across the gap between the electrodes), the gap current (i.e. the electrical current flow across the gap between the electrodes), the gap impedance (the electrical impedance measured across the electrodes) or a combination of these parameters or some other signal indicative of gap condition. The state of the gap may also be manifested by an optical or sonic signal and, when an electrical parameter is measured, some electrical-optical or electrical-acoustical transducer may be provided to yield the optical or sonic signal. The optical or sonic signal may, however, be formed by a suitable generator disposed directly in the gap if desired.

The apparatus also comprises a threshold means, preferably a Schmitt trigger having a pair of operating levels as described in the latest of the aforementioned applications, although any threshold triggering arrangement may be used; typical of threshold triggers according to the invention are Zener diodes or like electronic circuitry yielding a digital condition of one type when the unput exceeds a predetermined threshold and a signal of opposite sense when the input is below the threshold. Other systems capable of forming threshold devices include bi-stable multivibrators the inputs of which may be provided with capacitor-resistordiode (CRD) control gates or other bistable switching circuitry.

According to the principles of the present invention, the threshold means establishes a first digital condition upon the analog signal exceeding a predetermined threshold level and a second digital condition upon the analog signal falling below this threshold, or, preferably, a second threshold level, the function of which will be apparent hereinafter.

Upon establishment of these digital states, servodrive signals are generated at the output side of the threshold means and are fed to a servoactuator for advance and retraction of the movable machining electrode.

Reference herein to a "movable electrode" is to be understood as including either of a pair of electrodes when both are movable relative to a support so that the servomotor means may advance one of the movable electrodes but will retract the other.

When only one electrode is so movable, however, the servomotor means is bidirectional or reversible and may be an electric motor (see pages 276-313 of SERVOMECHANISM PRACTICE, McGraw-Hill Book Company, New York (Second Edition, 1960) or a fluid actuator or valve arrangement as described at pages 390 to 420 of SERVOMECHANISM PRACTICE, op. cit.

Between the servomotor and the threshold means there is provided a pair of electronic switches each of which is operated in a respective digital state and controls the operation of the servoactuator in one or the other sense. The electronic switches or amplifiers may be transistors or other solid-state switching devices, the control electrodes of which are connected to the output terminals of the threshold device and are triggered by the respective digital signals such that the occurence of the first digital state or the presence of the first digital signal causes the servoactuator to be displaced in one direction whereas the occurrence of the second digital state or the presence of the second digital signal causes the actuator to move in the opposite direction.

Since the servoactuator (servomotor) receives only opposite-polarity pulses of variable width but fixed amplitude and relatively sharp flanks or wave fronts, the control pulses vary sharply between a pair of opposing states and thereby sharply energize the servomotor with either of two active conditions depending upon the magnitude of the analog signal derived from the gap and compared or discriminated with respect to the predetermined threshold value. This method of response and actuation provides rapid quenching of any short circuit or arc and rapid recovery of a normal gap such that only spark-type discharges are formed. The system also allows accelerated follow-up feed of the movable electrode after correction of any deficient operation, provides for rapid elimination of the effect of mechanical inertia, and otherwise ensures the rapid movement of the electrode in either direction.

Advantageously, the digital state applied to the movable electrode is accompanied by a relatively small-amplitude vibration and the mechanism is designed to be less sensitive to hunting so that the movable electrode performs as if in a dynamic state always ready for activation. The vibratory movement of the electrode, though of short stroke, may be produced by triggering a gating network to which the vibrating pulse or signal train is delivered by an oscillator or the like. Freezing of the movable electrode is effectively eliminated and the system is at all times ready to move instantaneously in the required direction as the command is given.

Thus the system of the present invention can be thought of as involving the application of oppositely effective digital signals to a servomotor to drive the latter alternately in opposite senses until respective threshold values are crossed, whereupon the digital state is reversed. The resulting dynamic action of the electrode has been found to nullify the effect of inertia and backlash and, when coupled with step feed of the electrode, gives rise to precisions which can be reproduced only with complex, expensive but highly sensitive mechanical drives.

In accordance with any important aspect of the invention, oscillator means is provided between an electronic switch for each digital state connected in series with the respective servomotor coil, the oscillator providing drive pulses of predetermined amplitude and a pulse frequence and spacing determined by the requirements of the gap. Preferably, two relaxation oscillators are employed, each coupled with one of the electronic switches of the digital servomotor control, the oscillators being energizable by the Schmitt trigger in accordance with the digital state resulting from discrimination in the latter of the analog signal with respect to the threshold values mentioned earlier. Two modes of operation will immediately be apparent. In one such mode, an inverse control is employed for the step-feed oscillators, whereby the inputs to the latter are shunted by a controlled impedance, e.g. a transistor of other solid-state switch to render one relaxation oscillator ineffective while the latter is unshunted to apply step-feed pulses to the respective electronic switch. In the second operating mode, the Schmitt trigger merely energizes the corresponding relaxation oscillator for the duration of the corresponding digital state as represented by Schmitt-trigger output.

Still another feature of this invention resides in the provision of two threshold means for establishing a first and a second threshold in which the analog voltage or gap-monitoring signal triggers the first or second digital states while an intermediate zone is provided between these thresholds to create a condition in which neither coil of the servomotor is energized and the movable electrode is immobile for optimum machining. The threshold means may be two sets of Zener diodes or, preferably, a pair of Schmitt-trigger networks, each of which establishes a respective threshold and between the thresholds of which lies the dead or null zone. When a pair of Schmitt-trigger circuits is provided, each such circuit may be coupled with respective electronic switch in series with the servomotor drive source and the respective coil of the servomotor or with the electronic switch via an oscillator or pulser to provide step feed in the corresponding direction.

Still another feature of this invention resides in the provision of adaptive control means for regulating the parameters of the servocontrol circuit in accordance with gap conditions. Consequently, there is provided, in addition to the gap-monitoring circuit constituting the input to the Schmitt trigger or as part of the latter, means responsive to a further variable of the gap and operatively connected to the Schmitt trigger and/or the step-feed oscillator and/or the electronic switch circuit including the servomotor windings for adaptively regulating same in accordance with variations of gap parameters. The present invention contemplates control of the series impedance of the electronic switch circuit (in which a transistor has its principal electrodes in series with a power supply and one coil of the servomechanism) to modify the level of the digital output supplied directly to the servomechanism, control of the pulse height (amplitude), duration, width or frequency of the step-feed oscillator, or control of the duration or level of the digital output of the Schmitt trigger as will be apparent hereinafter. The frequency of the pulses, when step-feed oscillators are employed, is preferably controlled in accordance with the magnitude of the analog signal.

According to still another feature of this invention, the servoactuator has a pair of coils respectively energizable and effective in opposite directions so that they operate in a conjugate relationship, the electronic switches in series with these coils being operable substantially in "cut-off" and saturation ranges of the elctronic switch. The first coil may be responsive to the gap signal and, when the latter exceeds a preset value, is saturated to cut off the second switch which in turn de-energizes the corresponding coil. When the gap signal drops below a preset value which may be identical to or slightly less than the first preset value, the first electronic switch or transistor is cut off, thereby de-energizing the corresponding coil while driving the second switch or transistor into a saturated state and energizing the coil associated therewith or permitting this coil to remain energized.

It has been found to be advatageous, in some cases, to feed the electrode in one direction (e.g. upwardly or in "retraction") with a continuous digital signal in response to a gap signal crossing a preset value or threshold while intermittently interrupting this upfeed signal to eliminate the possibility of upfeed overrun; analogously, downward overrun resulting from a long travel in the downward or "advance" direction with high gynamic inertia is precluded.

The invention also provides means for jumping or momentarily shifting the electrode periodically or in response to the gap signal or, preferably, the servomechanism-operating signal to reduce contamination of the gap by occluded gases, metal particles and chemical or mechanical detritus of spark-discharge machining.

BRIEF DESCRIPTION OF THE DRAWING

These and other objects, features and advantages of the invention will become more readily apparent from the following description, reference being made to the accompanying drawing in which:

FIG. 1 is a circuit diagram illustrating a basic embodiment of the improved servo-signal generator constructed in accordance with the present invention;

FIG. 1a is a graphical representation of operating characteristics of the system of FIG. 1;

FIG. 2 illustrates another embodiment of the invention adapted to step-feed the machining electrode;

FIG. 3 is a diagram of a modification of the system of FIG. 2 wherein the frequency of feed pulses may be controlled in accordance with the detected gap signal;

FIG. 3a is a graphical representation of operating characteristics of the system of FIG. 3;

SPECIFIC DESCRIPTION

Figure 4:
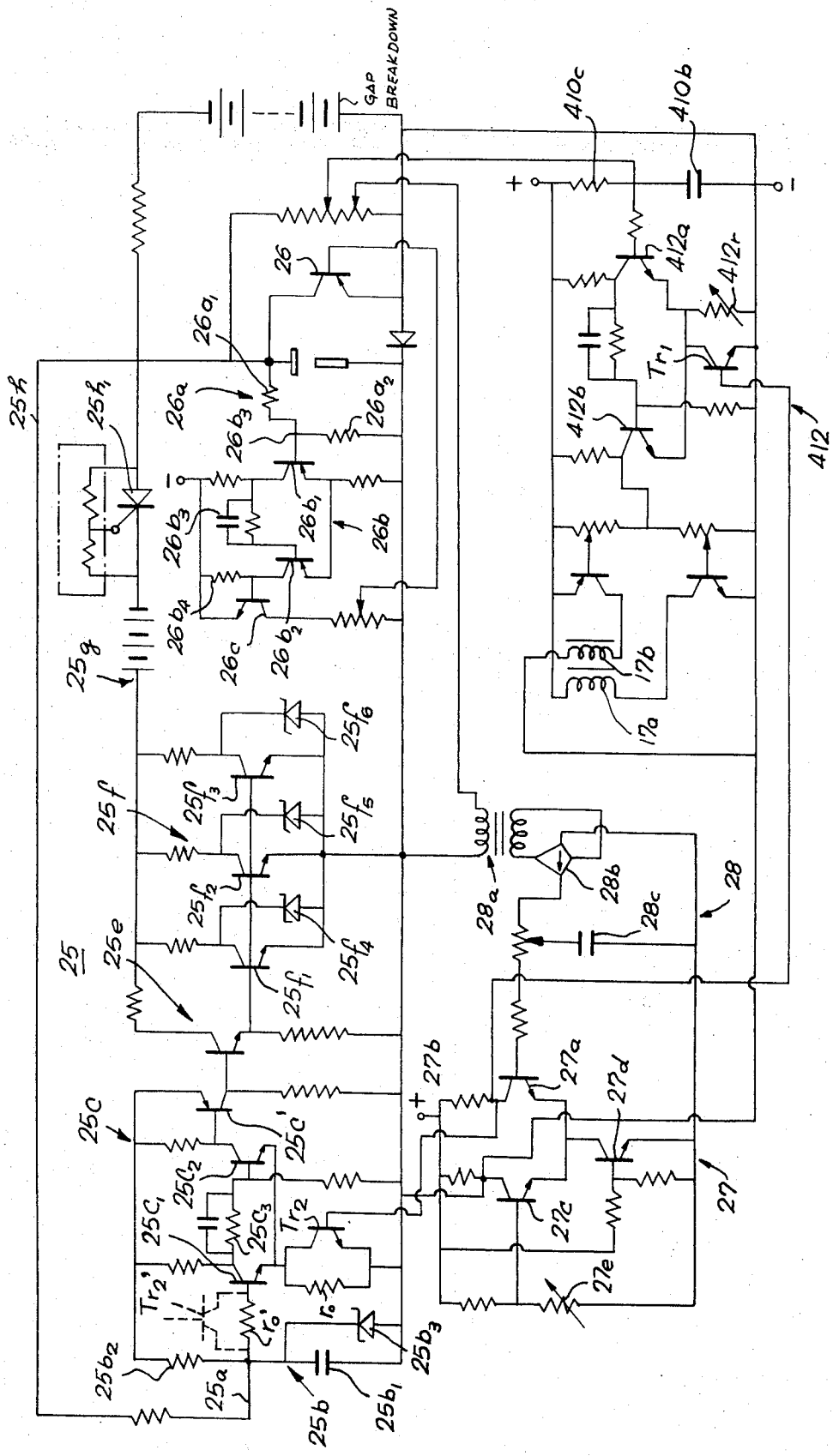
FIG. 4 is a circuit diagram of the improved servo system provided with an adaptive system in accordance with the present invention, as used with an optimal power supply for electric discharge machining.

Throughout the following description, several embodiments of the invention will be illustrated in conjunction with EDM principles because of the particular adaptability of the servosystems thereto but it is to be understood that the invention is applicable also to ECM (electrochemical machining), ECDM (electrochemical-discharge machining), ECDG (electrochemical-discharge grinding), spark sintering, high-energy-rate coating and shaping and other electrical machining or shaping processes.

In FIG. 1, there is shown a basic form of an improved servo signal generator which may be modified in various respects as will be apparent. A tool electrode E is juxtaposed with a workpiece W to form a gap or spacing $g$ between them in the presence of a machining medium while an electrical machining current is passed through the gap from a power supply 1 to remove material from the workpiece W. Parameters of the power supply are variable in dependence on the particular type of machining operation of interest. One or both of tool electrode E and workpiece electrode W is movable (this electrode will be referred to as a movable electrode hereinafter) and is servo-controlled to maintain the gap spacing $g$ in a manner fully described hereinbelow. Suitable power supplies with adaptively variable pulse duration or width, pulse height and/or pulse spacing are described in my application Ser. No. 838,575 copending herewith.

The improved servo system includes a gap sensor 10 for deriving from the gap an analog-varying signal representative of variable gap spacing as well as gap state or condition. The sensor is here constituted by a resistor 10a and an integrating capacitor 10b serially connected across the gap as shown to detect the mean gap voltage. At the junction of this resistor 10a and capacitor 10b is connected the positive terminal of a voltage source 11 via a variable resistor 10c which forms part of the gap-sensing means. Thus, with the indicated polarity relationship of electrodes E and W and of the source 11, the charge on capacitor 10b is controlled by source 11 via resistor 10c and also by the gap voltage via resistor 10a. The capacitor terminal voltage achieves a higher value when the gap voltage falls, indicative of a reduced or relatively narrow gap spacing, short-circuit or arc and a lower value when the gap voltage is increased indicative of open gap or greater gap spacing.

This will be apparent from the fact that the source 1 applies machining pulses to the gap which render the tool electrode negative with respect to the workpiece electrode and the aforementioned junction of capacitor 10b and resistor 10a. The negative potential, in an open-circuit condition or wide spacing of the gap, cancels the positive potential across the capacitor 10b from source 11 or provides a current drain to the same effect. Consequently, only when the gap shunts all or part of the potential from source 1, can higher positive potentials appear across the capacitor 10b and at the junction of this capacitor 10b with resistor 10a.

Connected to the output of the sensor 10, there is a discriminator or threshold means 12, here in the form of Schmitt circuit constituting an analog-digital converter energized by the source 11. The Schmitt trigger 12 establishes the digital conditions which are applied to output switches 16A and 16B, respectively, whose conductive states are used to energize a servo actuator in dependence upon the magnitude of the incoming analog signal which is discriminated or compared with two threshold values. The circuit 12 comprises a pair of NPN transistors 12a and 12b in conjugate relationship wherein a resistance-capacitance (R-C) time-constant network 12c connects the collector of the first transistor 12a with the base of the second transistor 12b. The input signal is applied from the output side of the integrating circuit 10 between the base and an emitter resistor 12r of the first transistor 12a, the resistor 12r being adjustable to establish a pair of threshold levels. The resistors 12d, 12e and 12f are respectively the base-bias resistor of output transistor 12b, collector-bias resistor of input transistor 12a and collector-bias resistor of the transistor 12b.

Connected with the output of the Schmitt trigger 12, are output resistors 13A and 13B interconnected at junction 14 which is tied to the collector of the transistor 12b via resistor 15. The movable wiper 13A' of the first output resistor 13A is connected to the base of PNP amplifying-switching transistor 16A whose emitter is connected to the other fixed terminal thereof and the positive terminal of the source 11 via a servo coil 17A with the collector being connected to the ground. The movable wiper 13B' of the second output resistor 13B is connected to the base of PNP transistor 16B whose collector is connected to the positive side of the source 11 via a servo coil 17B with the emitter being connected to the other fixed terminal and ground. In this case coils 17A and 17B are energizing coils for a servo valve 17 adapted to cause it to control the electrode in advance and retraction directions, respectively (see Servomechanism Practice, op. cit.). The respective positions of wipers 13A' and 13B' adjust the respective constant magnitudes of digital signals generated through these coils and hence advance and retraction powers generated through the servo valve. When an electric servo motor is used, these coils may form field coils or otherwise the signals may be applied to armature. Adjustment of wipers 13A' and 13B' may compensate differences in mechanical response in either direction.

Thus, when a vertical electrode is employed and gravity forces contribute to the downward movement of the electrode assembly, a lower amplitude of the "advance" digital signal may be provided while a somewhat higher amplitude of the "retract" signal may be established to overcome the gravity force. It should be noted that the embodiment of FIG. 1 also provides a respective electronic switch (transistor 16A or 16B) which has its principal electrodes (emitter/collector) in series with the respective electromagnetic coils or windings (17A or 17B) of the servomechanism.

The Schmitt trigger 12 is a bistable circuit having either of two possible states depending upon the level of the input signal applied at the base of transistor 12a. The variable resistor 12r, when set, establishes a pair of threshold values so that the circuit acts as a discriminator which converts the analog signal of the integrating circuit 10, depending upon its level, to a pair of digital outputs represented by the two states of the Schmitt trigger and appearing at output resistors 13A or 13B, respectively, which in the alternative energize amplifying transistor 16A and 16B.

In operation, when the terminal voltage of capacitor 10b is below a first threshold value and represents a higher gap voltage or wider gap spacing than the optimum, transistor 12a is nonconducting or blocked while transistor 12b conducts and the output transistor 16A conducts (digital "1" or "on"), while the other output transistor 16B is biased to its non-conductive (digital "0" or "off") state so that only the servo coil 17A is energized driving the movable electrode in the "advance" direction.

When, however, the terminal voltage of the capacitor 10b rises above the threshold value as the result of a decrease in the gap voltage or spacing below a preselected value, transistor a is biased into its conductive state, transistor 12b is cut off and the output transistor 16A is blocked (digital "0" or "off") while the other output transistor 16B is rendered conductive (digital "1" or "on") whereby the coil 17A is sharply de-energized and the other coil 17B, which had been de-energized previously, is sharply energized to cause the servomotor 17 to operate so that the electrode may move rearwardly (retract).

Thus, it will be seen that substantially instantaneous and sharp transitions occur between energizing signals and are accompanied by prompt reversal in movement. Overshoot, which might result from dynamic inertia, is effectively avoided and any short-circuit, arcing or the like undesirable condition, if prevalent, is quickly quenched.

The rearward movement of the electrode causes voltage build-up at the gap and decreases the terminal voltage of the capacitor 10b. When the input at the base of transistor 12a thus falls below a second threshold value, slightly less than the first threshold value, transistor 12b is driven into conduction and the coil 17A is thereby selectively energized and establishes the first digital condition mentioned above to drive the electrode in the "advance" direction. Here again, phase reversal in servo energization is instantaneous and the gap independent sharp signal amplitude eliminates overrun of the electrode.

In the normal gap voltage range, it will be seen that the electrode or servomotor produces minute reciprocation between two distances from the counterelectrode when this system is combined with a high-sensitivity mechanical arrangement and may assume even such tendency when a low-sensitivity feed apparatus is employed. It has been found that placing the system in such a dynamic condition or activated state promotes machining efficiency and effectively eliminates "freezing" or static inertia as ordinarily encountered in the null region. In effect, upon the gap analog signal reaching a first threshold value, the instantaneous phase (state) reversal between two digital states causes the electrode, when moving in one direction, to stop quickly while overcoming dynamic inertia or and resisting forces and establishes a condition whereby the electrode may reverse direction. Then, if the analog signal is maintained for an interval beyond a short delay time inherent in the apparatus and defined by the time constant of the system, indicating occurrence of a short-circuited, arc or open-gap condition, the electrode is promptly driven in the reverse direction to nullify such condition whereupon another phase reversal is established instantaneously by the analog signal traversing the second threshold value. On the other hand, if the analog signal, after passing through the first threshold, reaches the second within the delay time, the electrode will be held substantially at standstill to permit normal machining to be carried on.

FIG. 1a illustrates characteristics of the operation of the circuit of FIG. 1. In the diagram of FIG. 1a, time is represented along the abscissa while the positive ordinate represents the "advance" command and the negative ordinate represents the "retract" command or state. Assuming a proper machining condition during the interval represented at I and the incipient information of an open-gap condition wherein the gap width is excessive and incapable of permitting a spark discharge, the analog signal is maintained through the delay period $\Delta t$ and triggers the transition to an "advance" state as represented at II. Similarly, this state continues (with advance of the electrode and machining) during the interval III until the advance causes the analog-signal level to exceed the appropriate threshold and triggers, after the delay time $\Delta t$, the retraction command IV, the sequence being repeated at a rate determined solely by the duration of appropriate machining conditions.

In FIG. 2, there is shown a modified circuit arrangement for generating servo energization signals, which includes again a Schmitt circuit 112 providing digital signals in response to the gap signal.

In this FIGURE, as in subsequently described embodiments, functionally equivalent parts and circuit elements are designated by the reference numerals and letters previously employed but preceded by higher digits in the "hundreds" place. However, unless otherwise described, the tool electrode E and the workpiece electrode W are connected to an EDM or machining power supply of the adaptive type by terminals represented at + and − with the machining pulses having the indicated polarity. In all cases the machining-pulse power supply may be of the type described in the latest of the above-mentioned applications.

In this embodiment, however, the Schmitt circuit is designed to respond directly to the gap voltage; the latter here constitutes directly an analog signal detected by a voltage-divider resistor 110a connected across the machining gap while operating in the opposite mode to that in the FIG. 1 with respect to variation in the gap voltage.

Thus, when the gap voltage is higher than a first threshold value of the Schmitt circuit 112, the output resistor 113B receives a digital signal as a consequence of cut-off of transistor 12b and, when the gap voltage becomes lower than a second threshold value, the output resistor 113A receives the oppositely effective digital signal. Furthermore, at the output side of the Schmitt trigger circuit 112 are provided a pair of relaxation oscillators 18A and 18B to effect the "step-feed" of the movable electrode in advance and retraction directions, respectively, in response to digital states. The pulser or oscillator 18A includes an operating voltage source 18a and a capacitor 18b which is charged from the source via a charging resistor 18c and a diode 18d and discharges via a resistor 18e, the diode 18d being effective to block the discharge current.

The junction of resistor 18c and diode 18d is connected to the emitter of a unijunction transistor 18f whose first base is connected to the positive terminal of the source 18a via a bias resistor 18g and whose second base is connected to the negative terminal of the source. The first base of this unijunction transistor is in turn connected to the base of an amplifying transistor 19A whose emitter and collector are connected in series with a power supply 20A via resistor 21A, diode 22A and a winding 117A, the latter forming a first control winding of a servomotor 117.

As the capacitor 18b periodically charges and discharges, the unijunction transistor 18f is rendered alternately non-conductive and conductive to switch the output transistor 19A "on" and "off" thereby intermittently energizing the servo winding 117A. Here, resistor 18c and resistor 18d in conjunction with other elements establish charging and discharging periods, respectively, and hence "on" and "off" times of the transistor 19A while the oscillator is being operated, these resistors being variable to permit setting of the step "on" time and "off" time for each step feed. The resistor 21A, 21B is similarly adjustable to set the amplitude of each step in conjunction with the step "on" time. The second pulser 18B is shown to have the identical construction and may operate in substantially the same manner as that of the pulser 18A. Program means P may be provided for these pulsers to change the stroke of the step feed sequentially to meet changing requirement of the particular machining operations. In these pulsers there are also provided shunt transistors 114A and 114B connected across capacitors 18b and 18b', respectively, which transistors are energizable by digital signals developed at resistors 113A and 113B to short-circuit the operation of the respective pulsers.

In the operation of the system of FIG. 2, when the gap voltage is below the first threshold value of the Schmitt circuit 112, the output transistors 114A is conductive while the other output transistor 114B is non-conductive. This permits only the oscillator 18B to operate and hence the electrode to be fed stepwise in the gap-widening ("retract") direction at the rate determined by parameters of the oscillator 18B. Conversely, when the gap voltage is greater than the second threshold value of the Schmitt circuit 112, transistor 114A is nonconductive while transistor 114B is conductive. This permits only the first oscillator 18A to be operated and the electrode to be step-fed in "advance" direction at the rate determined by parameters of the oscillator 18A. Of course, the feed length for each step feed is set to a minute value substantially smaller than the normal machining gap spacing so that any overtravel is avoided.

In the embodiment of FIG. 2, therefore, the electronic switch 19A, 19B in series with the servomotor coil 117A, 117B, is energized via a stepping oscillator 18A, 18B rendered effective for the duration of the appropriate digital state. The amplitude of the digital output from the Schmitt circuit is here immaterial as far as the electrode drive is concerned, as long as the digital output suffices to operate the shunt transistors 114A and 114B. While the level of the digital output actually applied to the coils 17A and 17B is controlled by the potentiometers 13A, 13B in the system of FIG. 1, i.e. at the control electrodes of the switching or amplifying transistors 16A, 16B, in the system of FIG. 2, the level of each step during the course of the corresponding digital state is established by the potentiometers 21A or 21B in series with the principal electrodes of the switching transistors 19A, 19B and the respective coils 117A and 117B.

In FIG. 3, there is shown another embodiment of the invention which is similar to that of FIG. 2 but includes two threshold circuits for providing a null operation range between two digital ranges. Thus, the first threshold circuit is provided with a Schmitt trigger circuit 212A and a Zener diode ZDA, having the indicated orientation with respect to the gap polarity, at the input side of this Schmitt trigger while the second threshold circuit is formed by a second Schmitt trigger 212B as well as a second Zener diode ZDB as shown. The breakdown level of the Zener diode ZDA is adjusted at a value substantially identical to a first threshold or transition level of the Schmitt trigger 212A and higher than a second transition value thereof while the breakdown value of Zener diode ZDB is adjusted at a value substantially identical to a first threshold value of Schmitt trigger 212B and higher than a second transition value thereof. In addition, the first transition value of Schmitt trigger 212A is adjusted slightly higher than the first transition level of Schmitt trigger 212B.

Thus, it will be seen that when the gap voltage is sufficiently high to exceed the breakdown voltage of the Zener diode ZDA and the first transition value of Schmitt trigger 212A (the value is here defined as the first threshold value), transistor 212a is conductive and transistor 212b is non-conductive whereby the output transistor 214A is nonconductive.

For the second threshold circuit 212B, however, transistor 212a' is conductive and transistor 212b' is nonconductive so that the output transistor 214B is conductive. As long as transistor 214A is nonconductive and transistor 214B is conductive, only the oscillator 218A is permitted to operate and the electrode is step-fed in the "advance" direction to narrow the excessively widened gap spacing.

When the gap voltage falls below the first threshold value and before it drops to a second transition level of Schmitt trigger 212A, transistor 212a is rendered nonconductive as a result of cut-off of Zener diode ZDA and consequently the transistor 214A is driven into its conductive state, thereby blocking the operation of the oscillator 218A. The blocking of the second oscillator 218B is maintained, however, until the gap voltage falls below the second threshold value for the system, which is lower than the first threshold mentioned above, or below breakdown or cut-off level of Zener diode ZDB at which time transistor 212a' is cut off and transistor 212b' is driven conductive, thereby rendering the output transistor 214B non-conductive to permit the oscillator 218B to operate and consequently the electrode to be retracted stepwise.

Thus there exists a dead or null zone in which both the oscillators 218A and 218B are blocked from operation and the first and second threshold levels are adjusted so as to correspond to the upper and lower limits, respectively, of a preselected normal gap range. The operating characteristic of the system described is illustrated in FIG. 3a wherein the frequency of "advance" and "retraction" stepfeed is plotted along the ordinate with respect to the detected gap voltage plotted along the abscissa. The null zone for optimum machining is represented at $\Delta V$.

The system of FIG. 3 is shown to also include adaptive means which changes the rate of feed in accordance with the magnitude of a gap variable. This means, represented at 24, includes a gap monitoring NPN transistor 24a whose base is connected to the positive terminal of the gap resistor 110a and whose emitter is connected to the negative terminal of the gap resistor 110a and also to the negative side of a voltage source 24b. The collector of the transistor 24a is connected through a resistor 24c to the positive side of the supply 24b. Across the resistor 24c is connected an illuminator (lamp) Lp1 while a second illuminator (lamp) Lp2 is connected across the collector and emitter of the transistor 24a.

Oscillators 218A and 218B for pulsed electrode feed, which are illustrated to have a structure similar to those of FIG. 2, are provided respectively with variable charging resistor 218c and variable discharge resistor 218e for capacitor 218b; and variable charge resistor 218c' and/or variable discharge resistor 218e' for capacitor 218b', these variable resistors being formed in part by photoconductive elements adapted to receive light A and B emitted from lamps Lp1 and Lp2, respectively. It will be seen that a conductivity change of these elements changes the output pulse frequency.

The gap-monitoring transistor 214A, 214B, also serves as a variable resistor. Thus, when the gap voltage is high, the collector-emitter conductivity of this transistor is increased, thereby rendering the voltage drop at resistor 24c to be elevated and causing the intensity of illumination of lamp Lp1 to increase while causing the intensity of illumination of the second lamp Lp2 to decrease. Conversely, when the gap voltage is low, the conductivity of transistor 24a is decreased, thereby rendering the voltage drop at resistor to be decreased and diminishing the intensity of illumination of the lamp Lp1 while intensifying the illumination of the lamp Lp2. Thus, increase and decrease in the gap voltage result, respectively, in decreased "off" time and/or increased "on" time of "advance" step-feed pulses and increased "on" time and/or decreased "off" time of "retraction" step-feed pulses from oscillators 218A and 218B.

ADAPTIVE CONTROL

Extension research has demonstrated that in electrical machining various constantly varying characteristic conditions occur in the machining gap even with a carefully preselected mode of operation and gap spacing.

In EDM, for example, there are found several characteristic types of discharge which degenerate from one to another and variously contribute to the machining process. In the desired condition, the spark is a liquid-phase discharge with a high-energy concentrated discharge column highly pinched by the liquid environment.

Gaseous discharges with an expanded column occur as a result of the presence of increasing quantities of metal vapor and gases entrapped in the discharge zone. This latter condition, as well as liquid/gas-phase discharge (i.e. combined liquid-phase and gaseous discharge) and a quasi-short-circuit condition resulting from the accumulation of debris (decomposed products) and machined chips, tends to shift to a damaging continuous arc or short-circuit.

It has been found that an optimal machining performance is attained when the threshold circuit for servo response which determines the direction and timing of the electrode movement and generally the gap spacing is controlled depending on these characteristic conditions.

In FIG. 4, accordingly, there is shown an adaptive servo system which operates on this principle. This embodiment is here shown coupled with an adaptive EDM pulse generator 25 as illustrated in U.S. Pat. application Ser. No. 838,575 and additionally including means 26 for short-circuiting the gap through a shunt transistor 26a when the gap voltage falls below a predetermined value, say, 10 volts.

The servo circuit of FIG. 4 has a basic form and operation essentially identical to that shown in FIG. 1 and is provided in the threshold Schmitt trigger 412 with a variable impedance means, here constituted by an NPN transistor Tr1 connected across resistor 412r to control, coupled with the latter, a threshold value of servo operation in response to a signal derived from a comparator 27 as will be apparent. In accordance with the principles set forth, a gap-current monitor 28 is provided which includes a differentiator transformer 28a whose primary winding is connected across a variable tap and fixed terminal of a gap resistor as shown. The secondary winding of this transformer is connected via a full-wave rectifier 28b across an integrating capacitor 28c whose positive terminal is in turn connected to the base of an NPN transistor 27a in the comparator 27. Thus, it will be apparent that the terminal voltage represents a gap signal indicative of characteristic gap conditions or, in EDM, the degree of occurrence of liquid-phase discharges, gaseous discharges, liquid/gas mixed phase discharge, arc, short-circuit etc. Thus, higher capacitor terminal voltage indicates a higher proportion of normal discharges occurring while a lower integrating voltage indicates a condition tending to shift into continuous arc or short-circuit.

The comparator 27 is here constituted by a differential amplifier which includes a fixed voltage source 27b, NPN transistors 27c and 27d as well as the input signal transistor 27a along with resistive connections as indicated. Resistor 27e is variably adjustable to establish at the collector of transistor 27c a predetermined reference voltage depending on the particular type of machining operation to be conducted and, here, also corresponding to an optimum gap condition for comparison with the collector voltage of transistor 27a which is variable in accordance with actual gap characteristics. The comparison or differential signal derived is fed to the control electrodes of transistor Tr1 to change the collector-emitter conductivity thereof and hence the threshold value of Schmitt 412 in accordance with and as a function of the magnitude of the comparison signal.

In operation, it will be seen that when machining is carried on in an optimum mode, the integrating voltage at capacitor 28c is high, applying a greater control signal to the base of transistor 27a whose collector-emitter resistance and hence its collector voltage is thereby held at a value substantially balancing the collector voltage of transistor 27c. As a consequence, transistor Tr1 is held nonconductive or substantially non-conductive and the threshold Schmitt circuit 412 presents a maximum transition voltage, determined by the resistance of resistor 412r, for the input gap analog signal applied to the first transistor 412a of the Schmitt trigger. In this state, it will be seen that the system tends to hold the machining gap at a minimum preset spacing so as to facilitate metal removal or to allow machining to progress at maximum speed.

When, however, the gap condition worsens or gaseous-discharge or a similar condition appears, the collector voltage of transistor 27a rises above the collector voltage of reference transistor 27c, as a consequence of decrease in the terminal voltage of gap-responsive integrating capacitor 28c, and the differential signal from comparator 27 renders the transistor Tr1 conductive with its collector-emitter resistance determined by the magnitude of the differential signal. Consequently, the transition level of Schmitt trigger 412 is lowered and the system is thus controlled to tend to maintain a relatively widened gap spacing determined by the lowered servo threshold level so that the optimum condition can recover and development into continuous arc or the like damaging condition is avoided. Thus, it will be seen that there is provided a system which permits an optimal machining performance and maintains a maximum mode of operation at all times continuously adapting to varying gap conditions.

The system of FIG. 4 is shown to further include a threshold controller for the pulse width of machining current, constituted here by a transistor Tr2 constituting a variable-impedance means provided across threshold resistor $r_o$ or otherwise across input resistor $r_o'$ of Schmitt pulse former in the power supply 25. Thus, the differential output of comparator 27 mentioned above is also applied to the control electrodes of this transistor so that for an optimum machining condition the machining pulse width is held at a maximum preset value and, as the gap condition worsens, the pulse width is decreased accordingly to avoid further development into arcing or a like condition. Here again, therefore, an optimal machining performance is attained.

The power supply 25 as shown in FIG. 4 is, as noted, a modification of the system described and claimed in my copending application Ser. No. 838,575. This system includes a gap-condition detector connected across the gap and "represented by" the lead 25a between a capacitor 25b1 and a resistor 25b2, the capacitor being bridged by a Zener diode 25b3. The sensed signal, indicating gap condition, charges the capacitor 25b1 or bucks the charge delivered from some other source so that an integrated signal is applied to the base of transistor 25c1 of the Schmitt trigger circuit 25c. The signal applied to the control electrode or base of this transistor is delivered through the resistor $r_o'$ which may constitute a variable impedance as previously noted or via a transistor Tr2' whose principal electrodes may be connected in series with the base of transistor 25c1 and the integrating network 25b. A breakdown voltage source of higher potential than source 25g but in series with a current limiting resistor is connected across the electrodes.

The emitter-collector network of the Schmitt trigger transistor 25c1 includes the variable impedance system $r_o$ and Tr2 controlled by the comparator 27. Between the collector of transistor 25c1 and the base of the conjugate transistor 25c2 of the Schmitt trigger 25c, there is provided the usual time constant or delay network 25c3. The output of the Schmitt trigger is here derived across the resistor 25c4 to which the collector-base terminals of an amplifying and phase-reversal transistor 25d is connected.

Consequently, the integrated signal is applied to the base of the first transistor of the Schmitt trigger 25c, the thresholds of which are set by the variable-impedance network $r_o$, Tr2 as previously described. The output transistor applies its signal to the amplifying and phase-reversal transistor 25d, the latter in turn energizing a power switch in two stages as represented at 25e and 25f. The Schmitt trigger 25c may be of the type described at pages 389 ff. of PULSE, DIGITAL AND SWITCHING WAVEFORMS, McGraw-Hill Book Company, 1965 and acts as a discriminator converting the level of the input analog signal of the integrating circuit 25b to a digital output represented by the two states of the Schmitt trigger.

The two-stage power switch comprises a transistor 25e whose emitter is connected in parallel to the bases of the transistors 25f1, 25f2, 25f3, etc. The principal electrodes of the latter transistors are connected in parallel between a power source 25g, represented as a battery, and the electrode gap in series with the tool electrode E and the workpiece electrode W. Zener diodes 25f4, 25f5 and 25f6 are connected across the emitter-collector electrodes of the power transistors 25f1, 25f2, 25f3, ....to prevent overloading thereof. The machining current is, of course, controlled by the number of power transistors of this latter network which are connected in parallel between the source and the electrodes. An electronic switch 25h is also connected in series with the d.c. source 25g and is represented as a silicon-controlled rectifier 25h1 whose gate is triggered to turn on the power circuit.

As noted earlier, a shunt 26 is provided to short-circuit the electrodes E, W when the gap voltage falls below a predetermined value for effective machining of, say, 10 volts. The shunt circuit 26 comprises a gap voltage detector 26a, consisting of a pair of resistors 26a1 and 26a2 forming a voltage divider, the tap 26a3 of which is applied to th4 base of a transistor 26b1 forming part of a Schmitt trigger circuit 26b as described in Pulse, Digital and Switching Waveforms. Between the collector and base of the second or conjugated transistor 26b2, there is provided a time delay or time constant network 26b3. The output of the Schmitt trigger, which digitally controls the shunting operation, is developed across the resistor 26b4 and is applied to the base-collector terminals of an amplifying and phase-reversal transistor 26c. The output of the latter is applied via a potentiometer 26d to the base of the transistor 26e whose principal electrodes are connected in shunt across the workpiece electrode W and the tool electrode E. When the gap voltage drops below 10 volts, the Schmitt trigger 26b reverses in state and, via a transistor 26c, renders a transistor 26e conductive to short-circuit the gap.

Figure 5:
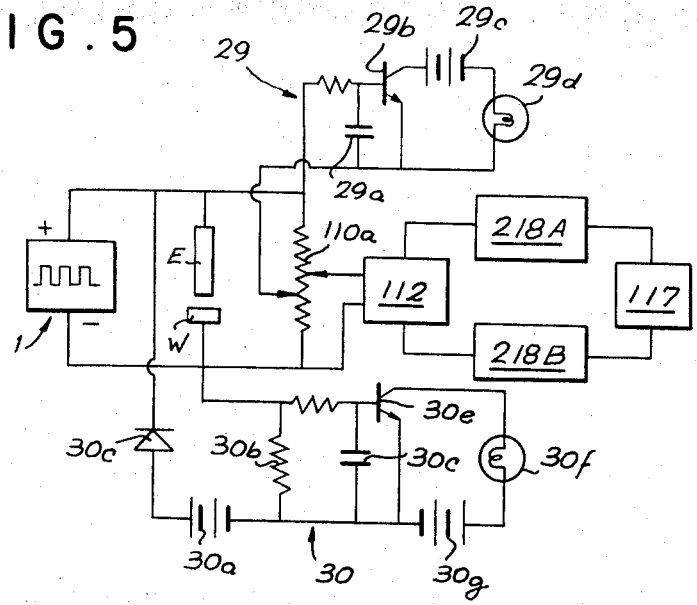
FIG. 5 is a circuit diagram, partly as a block diagram, showing another adaptive servo control according to the invention.

FIG. 5 shows diagrammatically another form of adaptive servo system or the rate control of servo feed in response to the gap condition. In this FIG., it may be understood that blocks labeled 112, 218A, 218B and 117 respectively represent a threshold Schmitt trigger, advance-feed pulser, retraction-feed pulser and servo motor as indicated in FIGS. 2 and 3. To gap resistor 110a there is connected a gap inspector 29 or means for monitoring gap machining characteristics, which comprises an integrating capacitor 29a, a transistor 29b, a current source 29c and a lamp 29d connected as shown.

The integrating capacitor 29c develops a higher voltage when machining is carried on in a better mode and a lower integrating voltage when machining characteristics worsen (indicating, in EDM, occurrence of gaseous discharges or a tendency to arc). The transistor 29b responds to such change and causes the lamp 29d under energizing current from source 29c to illuminate with an intensity generally proportional to the integrating voltage at capacitor 29a. The light emitted from this lamp is applied through an optical path (e.g. a fiber-optic system) to photoconductor 218e in pulser 218A and/or photoconductor 218c' in pulser 218B so that when the gap is in an optimum machining mode, the rate of "advance" step feed is held at a maximum value and/or the rate of "retraction" step feed at a minimum preset value. With a tendency toward undesirable machining characteristics, the opti-electronic control system immediately reacts to decelerate the "advance" step feed and/or accelerate the "retraction" step feed.

As an alternative or in addition to the gap inspector 29, a second gap monitor 30 may be provided adapted to sense the frequency of gap short circuiting which can occur from time to time even during a time interval in which the machining is carried on in the better mode. This second gap monitor includes a current source 30a of the indicated polarity, a sensing resistor 30b and a diode 30c, the latter being oriented to block the output of machining power supply 1 from flowing into the gap-monitor circuit. Thus, only when the gap is bridged, does a signal appear at resistor 30b and the source 30a is adjusted to permit this resistor to respond selectively to gap short circuit and exclude its response to normal machining current flow.

The short-circuit-indicating signal is applied to an integrator 30d whose terminal voltage controls the conductivity of a transistor 30e; the collector and emitter of the latter are connected in series with a lamp 30f and an energization source 30g therefor. Consequently, the lamp 30f may illuminate with a intensity generally proportional to the frequency of gap short-circuiting and the emitted light is applied through an optical path (e.g. direct illumination or fiber-optical system) to photoconductor 218c of pulser 218A and/or photoconductor 218e' of pulser 218B to control the feed rate in dependence on the frequency of gap short-circuiting and thereby eliminate possible hunting when repeated short circuits occur at the machining gap.

Figure 6:
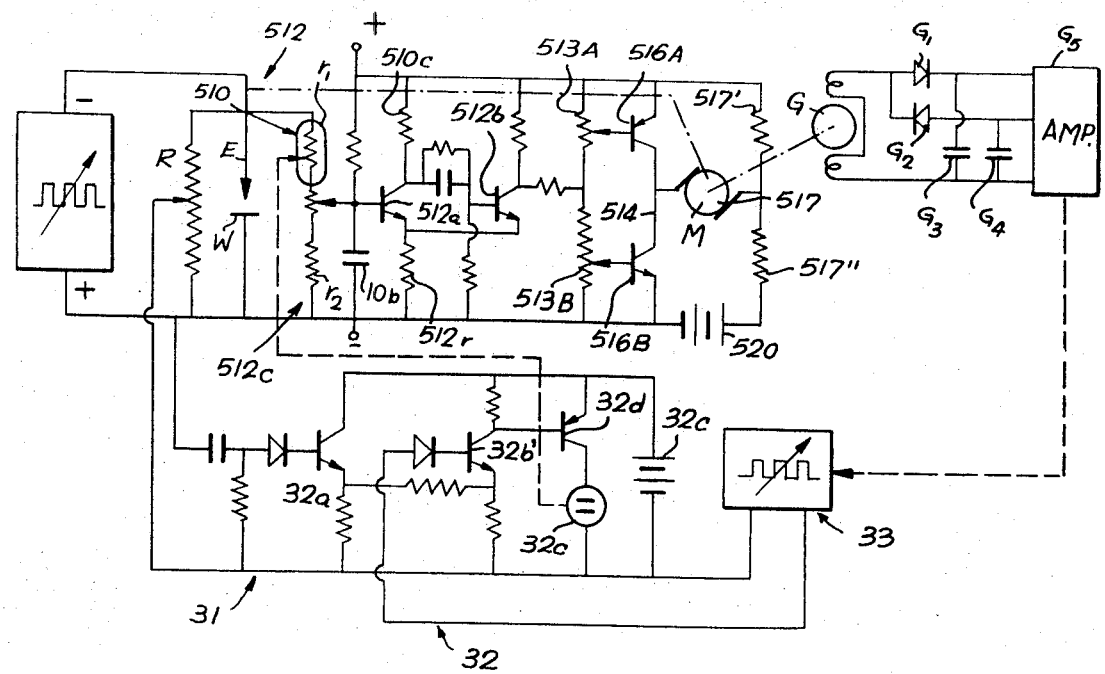
FIG. 6 represents yet a further circuit schematic of another adaptive servo control arrangement according to the invention.

In FIG. 6, there is shown still another form of adaptive servo system in accordance with the present invention, particularly suitable for use with self-adaptive EDM pulse generator as shown in and described with reference to FIG. 4. In this embodiment, the variable frequency of machining discharges (i.e. machining-current repetition rate) is compared with a preset reference frequency to monitor the gap machining characteristics, the comparison signal being applied to a servo threshold circuit as described hereinabove to adapt the servo operating mode to the variable gap characteristics. To this end, a gap sensor 31 is here constituted by a differentiator which, every time machining discharge is effected in the gap, delivers a signal pulse to a comparator logic circuit 32 which also is adapted to receive a reference pulse signal from an oscillator 33 such as an astable multivibrator.

Thus, the gap pulse signal is fed to the base of an NPN transistor 32a to render it conductive while a reference pulse signal is fed to the base of a second NPN transistor 32b of the logic circuit to render it conductive, these transistors being connected in parallel with a source 32c. A third transistor 32d, which is here of PNP type, is also provided as shown and is energizable only when the second transistor 32b is rendered conductive. Since the emitters of the first and second transistors 32a, 32b are interconnected, with respective emitter-bias resistors being provided, the third transistor 32d is rendered conductive only when the first transistor 32a is nonconducting and the second transistor 32b is conducting, thereby causing a lamp 32e connected in series therewith to be energized by source 32c.

In operation, it will be seen that for a unit time interval when the repetition rate of machining discharges falls as a consequence of failure of prompt gap deionization following the termination of a discharge or each discharge, the relative portion of the time for which the transistor 32d is turned to conduction is increased and consequently the intensity of light emitted from the lamp 32e is augmented. Conversely, when the rate of repetition of machining discharges is enhanced as a result of prompt deionization following each discharge, the intensity of light emitted from the lamp 32e is reduced. This intensity of light which changes responsively to the gap condition is applied as a control signal to a photoconductor $r_1$ provided in the servo threshold circuit. Thus, when the resistance of photoconductor $r_1$ is reduced because of the increased intensity of light from emitter 32e, the voltage drop at resistor $r_2$ connected in series with element $r_1$ across the gap rises relatively thereby causing the Schmitt trigger 512 to retard the instant of transition or digital phase reversal from the electrode retraction command to advance command for servo motor M and to advance the instant of transition or digital phase reversal from the electrode "advance" command to retraction command just as the threshold level of this Schmitt trigger is lowered. When, however, the repetition of discharges becomes enhanced, the decreased intensity of light signal at the lamp 32e due to an increased amount of incoming gap signal pulses canceling reference pulses at transistor 32b causes the resistance of photoconductor $r_1$ to be increased and the voltage drop at resistor $r_2$ to fall relatively, thereby causing the Schmitt trigger 512 to advance the instant of transition from the electrode "retraction" command to "advance" command for servo motor M and to retard the instant or point of transition from the electrode "advance" to "retraction" command.

The servo motor M may be coupled with a generator G having a rotor driven in synchronism with the rotation of the motor M and positive and negative signals of the generator may be rectified to form a signal which controls the frequency of a reference oscillator 33. This mode of control may be employed to amplify in certain cases or lessen in the others the effect of the adaptive control mentioned above.

In this embodiment, the gap-monitoring network 510 is nevertheless a voltage divider of the type shown at 110a in FIG. 2 although one branch of the voltage divider is constituted by the light-variable resistance $r_1$ whereas the other branch is constituted by the potentiometer $r_2$. Apart from this modification, however, the gap-monitoring analog signal is applied to the capacitor 510b of the Schmitt trigger which may be charged by a power supply such as those shown at 11 in FIG. 1 through the resistor 510c. The gap-analog signal then operates upon the transistor 512a in the previously described manner, the Schmitt trigger having a resistor 512r establishing the threshold and a time-constant network 512c constituting the delay means. The conjugate transistor 512b has its output applied to a terminal 514 between the potentiometers 513A and 513B, the wipers of which are tied to the bases of the transistors 516A and 516B. The transistor 516A is here of the PNP type whereas transistopr 516 B is of the NPN type, the collectors of the transistors being connected in common to one terminal of an electric servomotor, e.g. as described in SERVOMECHANISM PRACTICE, pages 276 ff. The servomotor 517 is returned between a pair of resistors 517' and 517" in series with a d.c. source 520. The servomotor is coupled mechanically with the electrode E and with the tachometer G which may be of the type described at pages 327 – 331 of SERVOMECHANISM PRACTICE, the output of the rate meter being applied via alternately effective diodes $G_1$, $G_2$, and capacitors $G_3$, $G_4$ of the pulse shaping networks to a pulse amplifier G5 controlling the frequency of the oscillator 33 for the purposes described earlier.

Figure 7:
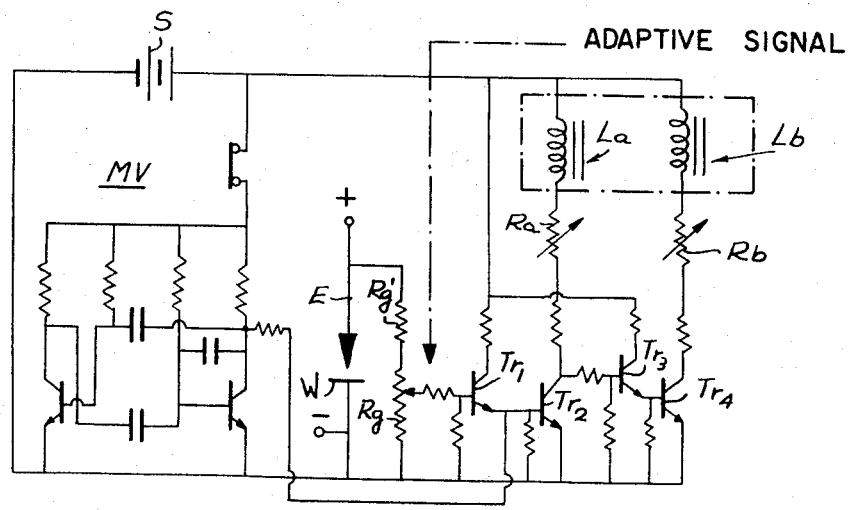
FIG. 7 is a diagram illustrating another embodiment of the present invention servo-signal generator.

In FIG. 7, there is shown another improved servo circuit in accordance with the present invention. The system includes a pair of solenoid coils La and Lb connected to a common source S and adapted to control a servo valve (see pp. 403 ff. of Servomechanism Practice) which in turn controls displacement of a movable electrode relative to a counter-electrode with the first coil La producing an advance command and the second coil Lb producing a retraction command, when respectively energized as will be apparent. The control circuit comprises two tandem sets of transistors Tr1, Tr2; Tr3, Tr4 with transistors Tr2 and Tr4 being connected with coils La and Lb through resistors Ra and Rb, respectively, to form electronic switches establishing two digital states for servo operation. Resistors Ra and Rb are here variably adjusted to determine magnitudes of "advance" and "retraction" digital signals induced through coils La and Lb, respectively. The output transistors Tr2 and Tr4 are controlled by amplifying or input transistors Tr1 and Tr3 for switch control thereby, respectively, the conduction and nonconduction of output transistor Tr2 determining nonconduction and conduction of second input transistor Tr3. The first input transistor Tr1 is here designed to receive at its control electrodes a gap signal which develops at an adjustable wiper terminal and fixed terminal of resistor Rg connected across the machining gap.

When the gap voltage is below a preset threshold value, which can be established by the position of adjustable wiper of gap resistor Rg, transistor Tr1 is substantially nonconductive and transistor Tr2 is cut off whereby coil La is deenergized. The elevated collector voltage of transistor Tr2 then renders transistor Tr3 conductive thereby causing transistor Tr4 to saturate so that servo coil Lb is energized to bring the electrode into "retraction" motion. This represents the first digital condition. The second digital condition occurs when transistor Tr2 is saturated in response to build-up in gap voltage detected by input transistor Tr1 and then the "advance" servo coil La is energized. Since the collector voltage of transistor Tr2 falls to nil, transistor Tr3 is turned to non-conduction and transistor Tr4 is cut off deenergizing the retraction servo coil Lb. By suitably adjusting bias resistors for these transistors, it is possible to render transition between these two states instantaneous with respect to changing gap voltage traversing the threshold value.

The system of FIG. 7 may also include an oscillator, here constituted by a free-running multivibrator MV (see Pulse, Digital and Switching Waveforms, pp. 437 ff.) whose output is fed to the control electrodes of transistor Tr2 to apply thereto a train of control pulses. While this pulser is designed to operate constantly, it will be seen that its output is effective at the servo valve only when the electrode up-feed command is generated through coil Lb. When the servo valve is subjected to down-feed command, the transistor Tr2 is held saturated and the input from pulser Mv to this transistor does not alter the cut-off state of transistor Tr4. When, however, the servo valve is subjected to up-feed command, the transistor Tr2 is held cut off and a train of pulses from the multivibrator MV is then effective to intermittently render this transistor conductive thereby energizing the down-feed coil La intermittently with the result that the up-feed command applied from coil Lb is intermittently canceled. It has been found that such control is advantageous in that it eliminates possible upward overtravel after occurrence of a shortcircuit and hence eliminates down-feed overtravel which may occur when the electrode is accelerated by traveling a long distance from an excessively retracted position.

As well as with other embodiments hereinbefore set forth, the system of FIG. 7 may be modified to perform adaptive servo control by providing threshold means responsive to gap machining characteristics.

Figure 1B:
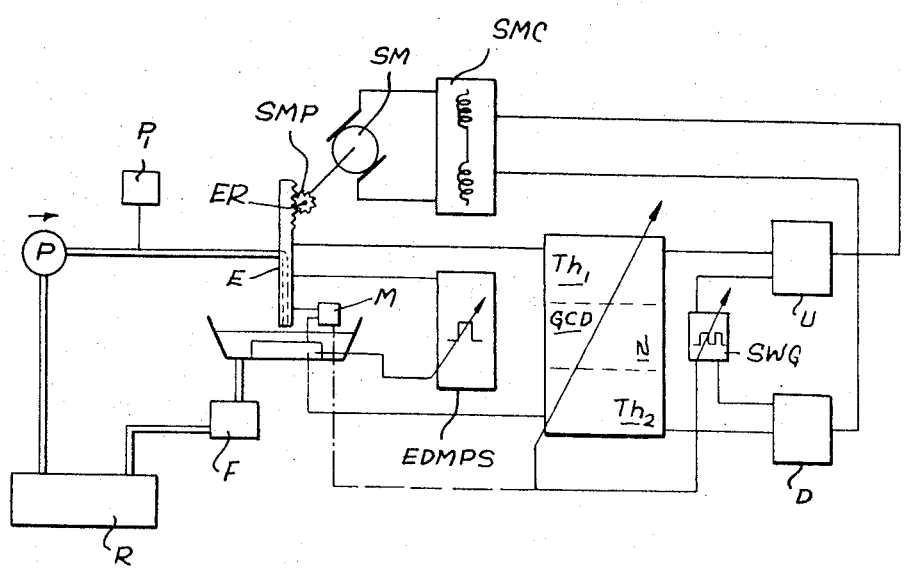
FIG. 1b is a block diagram illustrating principles of the invention.

In FIG. 1b, I show diagrammatically a system which embodies some of the principles of the present invention in an overall arrangement for electrical discharge machining. In this embodiment, the tool electrode E is hollow and receives a supply of coolant (e.g. a dielectric such a kerosene or transformer oil) from a pump P and a reservoir R. The fluid traversing the machining gap is collected and returned to the reservoir R through the filter F. A machining power supply EDMPS is connected across the electrode E and the workpiece W and may be provided with a gap monitor M, while being of the type described generally in connection with FIG. 4, i.e. of the adaptive type with automatic response to gap conditions.

The advance (downward movement) of the electrode E or retraction (upward movement) is controlled by a servomotor SM coupled with the electrode E by a rack-and-pinion arrangement ER and SMP and is energized via the bidirectional amplifier or control SMC.

When pulse feed is desired in the retraction and/or advance direction, one or more oscillators SWG may be provided with variable frequency, pulse height, pulse width and pulse spacing for application to the servocontrol via, for example, coincidence gates U and D responsive to the respective states of a threshold circuit of the Schmitt trigger or bistable multivibrator type represented at GCD. The thresholds Th1 and Th2 determine the digital stage which are applied as enabling signals to the gates. A null or dead condition in which no signal is applied to displace the electrode is represented at N. For adaptive control, the gap monitor M may be connected to the trigger circuit GCD or the oscillator SWG as previously described.

Figure 8A:
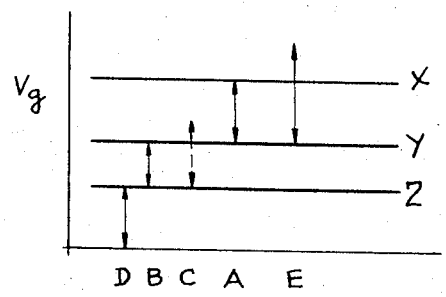
FIGS. 8a and 8b are graphical representation illustrating different characteristic conditions occurring in EDM process.
Figure 8B:
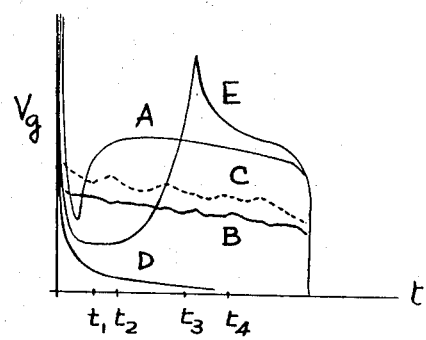

In FIGS. 8a and 8b, there is shown how different characteristic conditions actually occur in EDM as well as their relationship with detectable gap voltages as revealed which leads to the subject control concept. In FIG. 8b, curve A represents a typical voltage change within a single pulse of a liquid-phase discharge with a high energy discharge column fully pinched by the ambient liquid, curve B represents the voltage change of a gaseous discharge with the discharge column substantially expanded due to the presence of an increased amount of metal vapors and gases; curve C represents a liquid/gas mixed-phase discharge, a liquid-phase discharge as experienced in certain types of machining operations and is the optimum form of discharge; curve D represents short-circuiting and curve E represents the voltage change over a quasi-short-circuit which results from debris of decomposed products and/or machined chips.

As these curves indicate, it has been found that clear discrimination between the conditions is obtainable by monitoring the gap during the time interval between $t1$ and $t2$, say from one tenth to one fifth of the entire pulse width, or during the time interval between $t3$ to $t4$, i.e. a similar interval after aout one half of the entire pulse width. Thus, by establishing, for example, three threshold levels, it is possible to distinguish these time-variant discharge conditions from one another.

Figure 9:
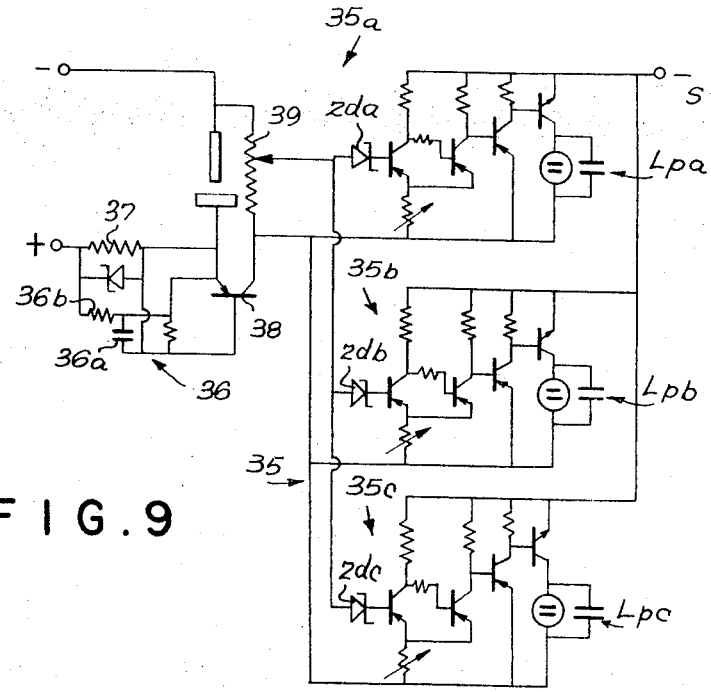
FIG. 9 is a circuit diagram of a system for providing gap-characterizing signals which may be used for adaptive control.

In FIG. 9, accordingly, there is shown a gap monitor 35 consisting of three threshold discriminators 35a, 35b and 35c for inspecting gap characteristics during a given time period within each machining pulse. To this end, delay means 36 is provided which permits these discriminators responsive to a gap signal selectively during such a time period. The delay means comprises a capacitor 36a adapted to commence charging via a resistor 36b in response to initiation of each discharge by a voltage drop developed at a sensing resistor 37 connected in series with the machining gap and one terminal of a machining power supply.

The positive terminal of capacitor 36a is connected to the emitter of PNP transistor 38 and its negative terminal is connected with the base of this transistor. The emitter and collector of transistor 38 are connected in series with a gap-monitoring resistor 39, the series connection being provided across the machining gap. Thus, it will be seen that a given delay time after initiation of machining pulse the capacitor 26a discharges and transistor 38 is rendered conductive connecting the gap information resistor 39 to the gap and permits development thereat of a signal proportional to the existing gap voltage only for a time period given by the discharge time of capacitor 26a.

Each of threshold discriminators 35a, 35b and 35c may be constituted by a Schmitt circuit, as shown, coupled with a Zener diode Zda, Zdb, Zdc provided at the input side thereof; the preset Schmitt transition voltage as well as the respective Zener breakdown voltage determing a particular threshold value to be established. Since short-circuit voltage is approximately nil, the gaseous discharge voltage is about 30 volts, the mixed gas/liquid discharge voltage is about 40 volts, and the liquid-phase discharge voltage approaches 50 volts during a period from $t1$ and $t2$ in a typical situation, it is apparent that three threshold levels for discriminators 35a, 35b and 35c when set, for example, at 20 volts, 35 volts and 45 volts, respectively, provide clear demarcations between those characteristic discharges.

At the output of each discriminator there is provided an illuminator (lamp) Lpa, Lpb, Lpc energizable by a source S and it will be seen that the gap signal, when it exceeds the respective thresholds values, permits them to be illuminated. Thus, during the period $t1 - t2$, when the gap is short-circuited, all of the lamps Lpa, Lpb and Lpc are de-illuminated; when a gaseous discharge occurs, only lamp Lpa is permitted to illuminate; when discharge is of mixed gas/liquid type, the second lamp Lpb is also illuminated and when discharge is of liquid-phase type, all of the lamps are lit. The light signals may be applied to a servo circuit as described hereinabove to thereby change the thresholds for gap control and/or the feed rates so that the electrode may be controlled in a manner to adapt to a particular existing gap-characteristic condition. For example, a portion of resistor Rg' which forms the gap voltage divider with resistor Rg in FIG. 7 may be constituted by a photoconductor to which light signals from lamps Lpa, Lpb and Lpc may be applied. In the system of FIG. 1, such a photoconductor may form resistor 10a. The system of FIG. 2 may also be made adaptive by providing a photoconductor in parallel with Schmitt resistor 112r and rendering it responsive to signals from the adaptive system 35. By providing such modifications, an improved servo operational mode is obtained and optimal and stabilized machining performance attained, not attainable with usual single reference or threshold servo.

Figure 10:
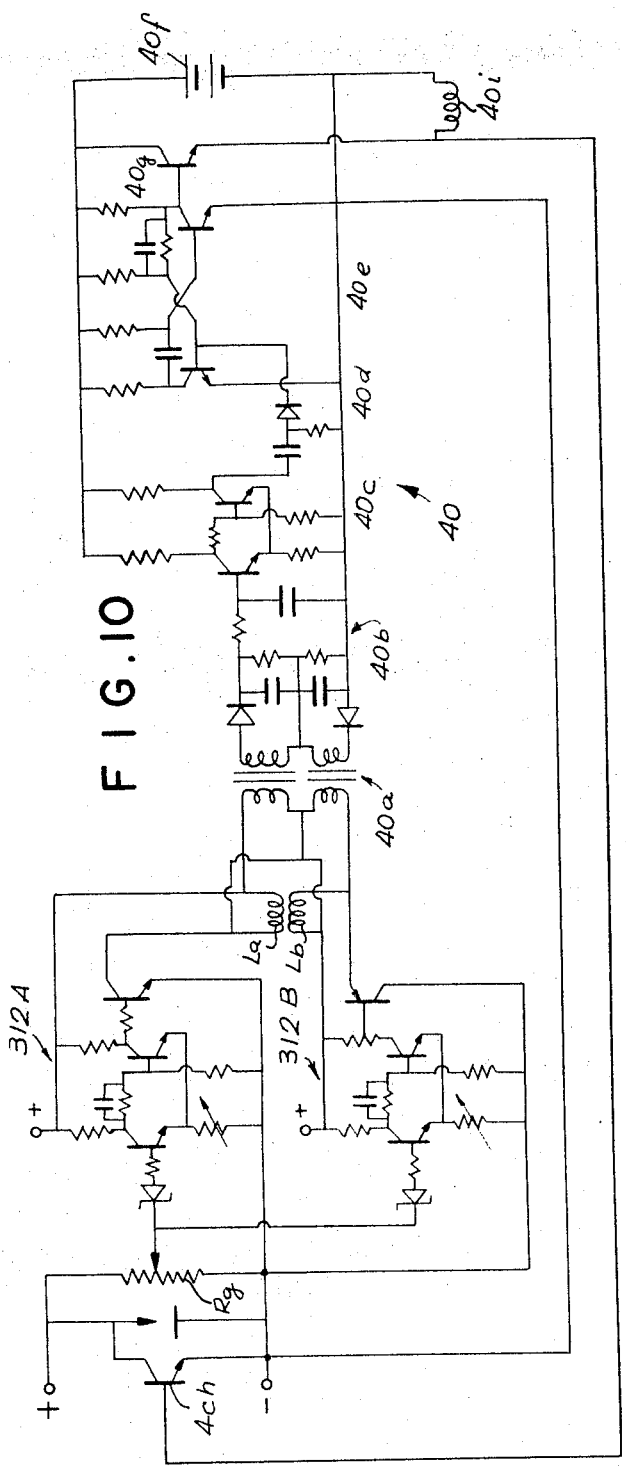
FIG. 10 shows a still further embodiment of the present invention.

In FIG. 10, there is shown still another improved electrode positioning system which is particularly suited for EDM and includes an electrode jumping unit adapted to operate in conjunction with a servo unit as described earlier. The servo circuit here comprises a pair of Schmitt circuits 312A and 312B adapted to induce a preset "down" signal and a preset "up" signal through servo coils La and Lb, respectively, upon discrimination of the gap voltage with respect to a preset higher threshold value and a preset lower threshold value. In this case, when the gap voltage is between these threshold values, no signal develops either at coil La or Lb and servo member is held at null point. Thus, the servo operates in three clear-cut, digital states depending on the magnitude of the gap voltage.

The electrode jump unit 40 comprises transformer 40a whose primary winding is connected to coils La and Lb to detect "up" signal and "down" signal applied thereto and secondary winding is connected via rectifiers as shown to an integrator network 40b whose terminal voltage thus indicates occurrence of "up" signals and "down" signals for a unit time. The output of this integrator is connected to a Schmitt trigger 40c whose output is in turn connected via a differentiator network 40a to a single-shot multivibrator 40e. These latter three networks are commonly energized by a source 40f. Provided at the output of multivibrator 40e is a transistor 40g whose primary electrodes is connected in series with the source 40f and control electrodes of transistor 40h having primary electrodes connected across the machining gap.

Due to machining detritus, the electrode servo motion may cause "hunting", and then the frequency of occurrence of "up" signal and "down" signals is increased. Consequently, when the terminal voltage of integrator 40b rises above a preset transition level of Schmitt trigger 40c, single-shot multivibrator 40e is activated to generate a pulse of a given duration and render transistor 40g and hence transistor 40h conductive thereby shunting the machining gap, for said pulse duration. As long as the gap is shunted or, the gap resistor Rg presents only "short-circuit" signal for the servo sensors 312A and 312B, irrespective of whatever voltage drop really exists and the machining gap and only an "up" feed signal is permitted to develop by Schmitt trigger 312B through coil Lb thereby causing the machining electrode to jump or forcibly to move upwardly. Upon termination of the pulse from single shot, whose pulse duration may, of course, be adjusted to suitably determine the jump stroke in conjunction with the intensity of "up" signal, the machining gap voltage will become high or open circuit voltage and then the Schmitt circuit 312A will instantaneously provide a "down" feed command through coil La for resumption of machining operation. By way of quickjump procedure, there is created a sort of "pump" effect. During abrupt upward motion, fresh machining liquid is sucked into the gap and during abrupt downward motion which then follows such liquid is pumped out carrying away substantially any detritus and tar accumulated thereby clarifying the machining area; the procedure is particularly suitable for the sinking of a deep and/or small hole or where machining liquid is not circulated for the purpose of "no wear" operation or other although not limited for such use. Where machining liquid is circulated, its flow rate or pressure may advantageously be augmented simultaneously with the quick jump described (e.g. via an intermittently operated plunger pump $P_1$ (FIG. 1b) thereby further augmenting the effect of detritus removal or gap clarification. Short-circuiting the machining power through the shunt path 40h described is also advantageous since it is effective to instantaneously cut off any undesirable condition which may cause hunting. FIG. 10 also shows a coil 40i coupled with servo member and as energizable by the output of single shot 40e, as an alternative or preferably in addition to transistor 40h, to produce the quick jump signal for the servo valve.

In the system of FIG. 1 and those later described, Schmitt triggers have been provided such that at the output transistor 12b etc. digital states are created which have been described as "on" or "off" and "advance" or "retract" in accordance with the state of conduction of the respective transistor. Each of the digital states is manifested by the conduction of one of the switching transistors in series with the servomotor coil, the other transistor being substantially de-energized. It has already been noted that the cut-off or deenergized state is described as an "off" or "nonconductive" condition exclusively for convenience, although it is likely that the transistor in the "off" condition may nevertheless be slightly conductive or may carry a small current incapable of affecting operation of the servomotor.

Figure 11:
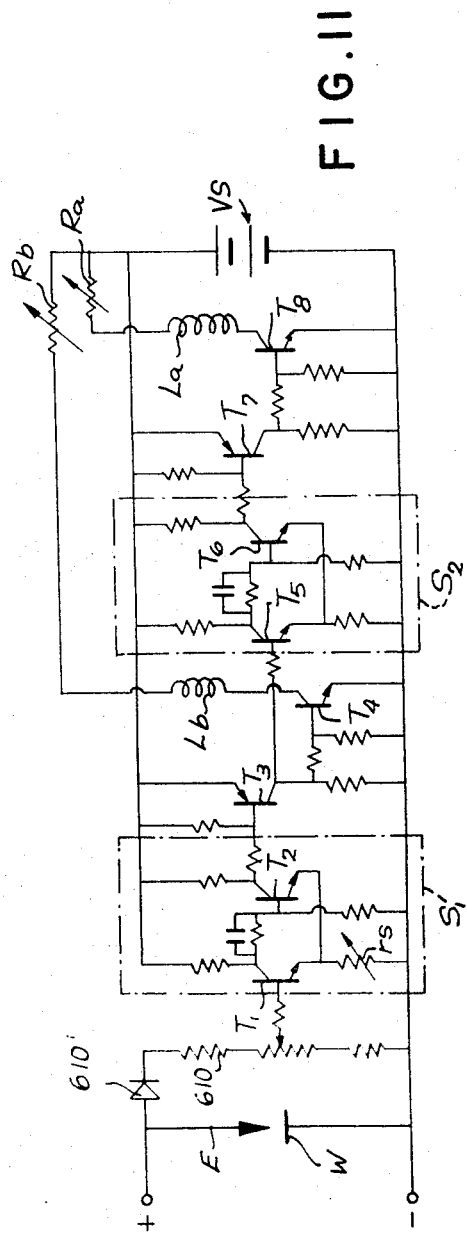
FIG. 11 is a circuit diagram of a system according to the invention wherein the control is substantially continuous.

It has, however, been found to be advantageous to completely cut off the inoperative side of the system, i.e. the "off" switching device so that the latter carries no current whatever. To this end, there is provided the circuit illustrated in FIG. 11 wherein a pair of Schmitt triggers S1 and S2, each operate one of the coils Lb and La, respectively, and are connected in tandem. An output being applied across the electrode E and the workpiece W. The first Schmitt trigger S1 operates in response to the analog gap voltage as drawn from the gap via a voltage divider network 610 to respond to the gap voltage directly, the diode 610' being employed to prevent current reversal or reverse current perturbations from reaching the initial transistor T1 of this Schmitt trigger. Of course, it is also possible to substitute for the gap monitoring network 610, 610' an integrating circuit with resistors, capacitors and a current source as illustrated in FIGS. 1, 4, etc. The first Schmitt trigger S1 is provided with a variable impedance such as a potentiometer $r_s$ establishing the initial threshold value. The second Schmitt trigger, in this case, operates in response to the output of the first Schmitt trigger.

The output transistor T2 of the first Schmitt trigger S1 is applied to the base of transistor T3 of the PNP type, the collector of which is tied to the base of the input transistor T5 of the second Schmitt trigger S2. Also to the collector of transistor T3 and across the collector-bias resistor thereof, there is connected the base emitter network of the NPN transistor T4 whose principal electrodes (emitter-collector) lie in series with the coil Lb and the power source VS for the servomotor. Coil Lb constitutes one winding of this servomotor and when energized drives the electrode in one direction as previously noted. A variable resistor Rb in series with the coil Lb determines the amplitude of the current traversing this coil and thus is functionally equivalent to the potentiometers 13B or 21B previously described and can be adaptively adjusted via a photoconductor and lamp arrangement as described, for example, in connection with FIG. 3.

The second transistor T6 of Schmitt trigger S2 is similarly provided with a PNP amplifying transistor T7 also serving in a phase-reversal role, across the output or collector-bias resistor of which are applied the base emitter terminals of NPN transistor T8. The latter has its principal electrodes connected in series with the source VS the coil La of the servomotor which is effective in the opposite direction from that of coil Lb, and the variable resistor Ra whose setting determines the magnitude of the second digital signal delivered to the servomotor.

When the gap signal (analog) is above a preset value established by the resistor $r_s$, transistor T1 is conductive, transistor T2 is nonconductive as is transistor T3 and transistor T4 is cut completely off so that no current whatever flows through the coil Lb which is isolated from the coil La by the Schmitt trigger S1 and its amplifying and phase-reversing transistors T3 and T4.

Since transistor T3 is off, however, the input transistor T5 of the second Schmitt circuit S2 is off so that conjugate transistor T6 is conductive as in the transistor T7. Conduction of transistor T7 places transistor T8 in a conductive state to permit current to flow through the coil La.

When the gap signal falls below the threshold value, the transistors reverse substantially instantaneously and the coil Lb is energized while coil La is de-energized. Buildup of the gap signal above the threshold value causes another state reversal with de-energization of the coil Lb and energization of the coil La as described in connection with the system of FIG. 1.

The improvement described and illustrated is believed to admit of many modifications within the ability of persons skilled in the art, all such modifications being considered within the spirit and scope of the invention except as limited by the appended claims.

I claim:

1. A servocontrol system for relatively positioning a pair of electrodes spacedly juxtaposed across a current-traversing gap, comprising:
   gap-monitoring means connected across said electrodes for producing an electrical signal representing the gap width;
   a first SCHMITT trigger circuit connected to said gap-monitoring means and having an output element;
   motive means including coil means energizable to displace said movable electrode in opposite directions;
   a first electronic switch connected in circuit with an electrical power source and said coil means and connected to said element and responding to said first SCHMITT trigger for operating said motive means in one direction;
   a second SCHMITT trigger connected to said element of said first SCHMITT trigger; and
   a second electronic switch connected to said second SCHMITT trigger and in circuit with said source and said coil means for operating said motive means in the opposite direction upon detection by said second SCHMITT trigger of a condition at said first SCHMITT trigger rendering said first electronic switch ineffective.

2. The system defined in claim 1 wherein said gap-monitoring means includes a voltage divider connected across said electrodes and a diode in series with said voltage divider.

3. The system defined in claim 1 wherein said first SCHMITT trigger is provided with a variable resistor establishing a threshold level for the electrical signal representing the gap width.

4. The system defined in claim 1 wherein said coil means includes a pair of oppositely effective coils, said first electronic switch comprising a transistor having one of said coils connected in series with the collector-emitter network thereof, the second electronic switch constituting a transistor having the other of said coils connected in series with the collector-emitter network thereof.

5. The system defined in claim 4 further comprising a respective variable resistor in series with each of said coils.

6. The system defined in claim 5 wherein said first SCHMITT trigger is provided with an amplifier transistor constituting said element and connected to the base of the transistor constituting said first electronic switch, said second SCHMITT trigger having an input transistor with a base connected to said amplifying transistor.

7. The system defined in claim 1 wherein at least one of said SCHMITT triggers defines an operating threshold, further comprising means for automatically modifying said threshold in response to a parameter of said gap.

8. The system defined in claim 1 wherein said gap-monitoring means includes an integrating network between said electrodes and said first SCHMITT trigger.

9. The system defined in claim 1 wherein said movable electrode is a tool electrode and the other electrode is a workpiece electrode, said apparatus further comprising means for circulating a liquid coolant through said gap.

* * * * *